US008671428B2

(12) United States Patent
Agricola et al.

(10) Patent No.: US 8,671,428 B2
(45) Date of Patent: Mar. 11, 2014

(54) SYSTEM AND METHOD FOR A PERSONAL VIDEO INBOX CHANNEL

(75) Inventors: Arleen Agricola, San Mateo, CA (US); Edward Wang, Claremont, CA (US); Michelle Oviedo, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 846 days.

(21) Appl. No.: 11/936,982

(22) Filed: Nov. 8, 2007

(65) Prior Publication Data

US 2009/0125951 A1     May 14, 2009

(51) Int. Cl.
*H04N 21/258*     (2011.01)
*H04N 21/231*     (2011.01)
*H04N 21/262*     (2011.01)

(52) U.S. Cl.
CPC .... *H04N 21/25891* (2013.01); *H04N 21/23109* (2013.01); *H04N 21/26291* (2013.01)
USPC .............................................. 725/48; 725/91

(58) Field of Classification Search
CPC .............................................. H04N 21/25891
USPC ..................................................... 725/48, 91
See application file for complete search history.

(56) References Cited

U.S. PATENT DOCUMENTS

| | | | |
|---|---|---|---|
| 6,795,863 B1 | 9/2004 | Doty | |
| 6,965,926 B1 | 11/2005 | Shapiro et al. | |
| 7,293,275 B1 | 11/2007 | Krieger et al. | |
| 7,783,622 B1 * | 8/2010 | Vandermolen et al. | 707/708 |
| 2001/0052019 A1 | 12/2001 | Walters et al. | |
| 2002/0056123 A1 | 5/2002 | Liwerant et al. | |
| 2002/0129367 A1 * | 9/2002 | Devara | 725/46 |
| 2002/0180788 A1 | 12/2002 | Wu | |
| 2003/0088687 A1 | 5/2003 | Begeja et al. | |
| 2003/0122922 A1 | 7/2003 | Saffer et al. | |
| 2003/0149802 A1 | 8/2003 | Curry et al. | |
| 2003/0163819 A1 | 8/2003 | Lee et al. | |
| 2004/0049546 A1 | 3/2004 | Yoshida | |
| 2005/0033855 A1 | 2/2005 | Moradi et al. | |
| 2006/0212531 A1 | 9/2006 | Kikkawa et al. | |
| 2006/0242664 A1 | 10/2006 | Kikkawa et al. | |
| 2007/0058647 A1 | 3/2007 | Bettis et al. | |
| 2007/0073704 A1 * | 3/2007 | Bowden et al. | 707/10 |

(Continued)

FOREIGN PATENT DOCUMENTS

| | | |
|---|---|---|
| KR | 20010092982 | 10/2001 |
| KR | 20030079559 | 10/2003 |
| TW | I221372 B | 9/2004 |
| WO | 02/45430 A2 | 6/2002 |

OTHER PUBLICATIONS

U.S. Appl. No. 11/828,218, filed Jul. 25, 2007, Office Action, Aug. 2, 2010.

(Continued)

*Primary Examiner* — Bennett Ingvoldstad
(74) *Attorney, Agent, or Firm* — Hickman Palermo Truong Becker Bingham Wong LLP

(57) ABSTRACT

A method of aggregating video content receives video content data related to video content, evaluates and aggregates this information, and subsequently forwards the aggregated information to a viewing client where it can be viewed by a user. In one embodiment, the video content data contains a Universal Resource Indicator (URI) that specifies to the viewing client the location of the video content.

26 Claims, 3 Drawing Sheets

(56) References Cited

U.S. PATENT DOCUMENTS

| | | | |
|---|---|---|---|
| 2007/0094333 A1 | 4/2007 | C. Shilling et al. | |
| 2007/0244977 A1 | 10/2007 | Atkins | |
| 2007/0288574 A1 | 12/2007 | Koster et al. | |
| 2008/0120328 A1 | 5/2008 | Delgo et al. | |
| 2008/0168503 A1* | 7/2008 | Sparrell | 725/58 |
| 2008/0209480 A1 | 8/2008 | Eide et al. | |
| 2009/0019034 A1* | 1/2009 | Franks et al. | 707/5 |
| 2009/0086937 A1 | 4/2009 | Horn et al. | |
| 2009/0094646 A1* | 4/2009 | Walter et al. | 725/48 |
| 2010/0138863 A1* | 6/2010 | Diaz Perez | 725/42 |

OTHER PUBLICATIONS

U.S. Appl. No. 11/828,218, filed Jul. 25, 2007, Final Office Action, Apr. 21, 2010.

U.S. Appl. No. 11/828,218, filed Jul. 25, 2007, Non Final Office Action, Sep. 8, 2009.

U.S. Appl. No. 11/828,218, filed Jul. 25, 2007, Notice of allowance, Jan. 21, 2011.

Michael Arrington, "Orgoo—The Web Email/IM Replacement", http://www.techcrunch.com/2007/05/14/orgoo-the-web-emailim-replacement/, May 14, 2007, pp. 1-2 Note: The site/service to which the article refers (orgoo.com is currently in private beta; the site was last viewed on Oct. 24, 2007.

FeedReader 3.11 Beta 3, 2 pages.

FeedReader 3.11 Beta 3 Screenshots, 4 pages.

Taiwan Patent Office, "Examination Opinions" in application No. 97128474, dated Oct. 18, 2013, 3 pages.

Current Claims in application No. 9712874, dated Oct. 2013, 1 page.

\* cited by examiner

SYSTEM AND METHOD FOR A PERSONAL VIDEO INBOX CHANNEL

BACKGROUND

1. Field of the Invention

Aspects of the present invention relate generally to a system that allows a user to create and view a personal video "channel," where the channel comprises video content from disparate sources and is available to the user anywhere.

2. Description of Related Art

Currently, there exists no simple way of consuming the myriad video options available to end users. Generally, users must be in close physical proximity to the various devices used to decode and present the video content received by the devices. For example, if a user has recorded something to his Digital Video Recorder (DVR), he must usually watch that recorded content in his home and on his TV. Similarly, if a user wants to watch an on-demand movie (VoD), he generally must be in front of his TV at home. Further, there are currently so many disparate sources of content and methods of retrieving them (e.g., cable, satellite, Internet, broadcast, mobile, etc.), that an end user can feel overwhelmed with the amount of options available, especially where the user finds the vast majority of available video content uninteresting, but has a very specific idea of what sort of content he does like.

Thus, it is desirable to provide a user with a personal video channel—customized and "programmed" by him directly, and indirectly by taking into account content he has already consumed—which can be viewed from various locations other than those generally associated with the various content sources.

SUMMARY

In light of the foregoing, it is a general object of the present invention to enable a user to consume personalized video content, originating from disparate sources, wherever he chooses.

BRIEF DESCRIPTION OF THE DRAWING FIGURES

DETAILED DESCRIPTION

Figure 1:
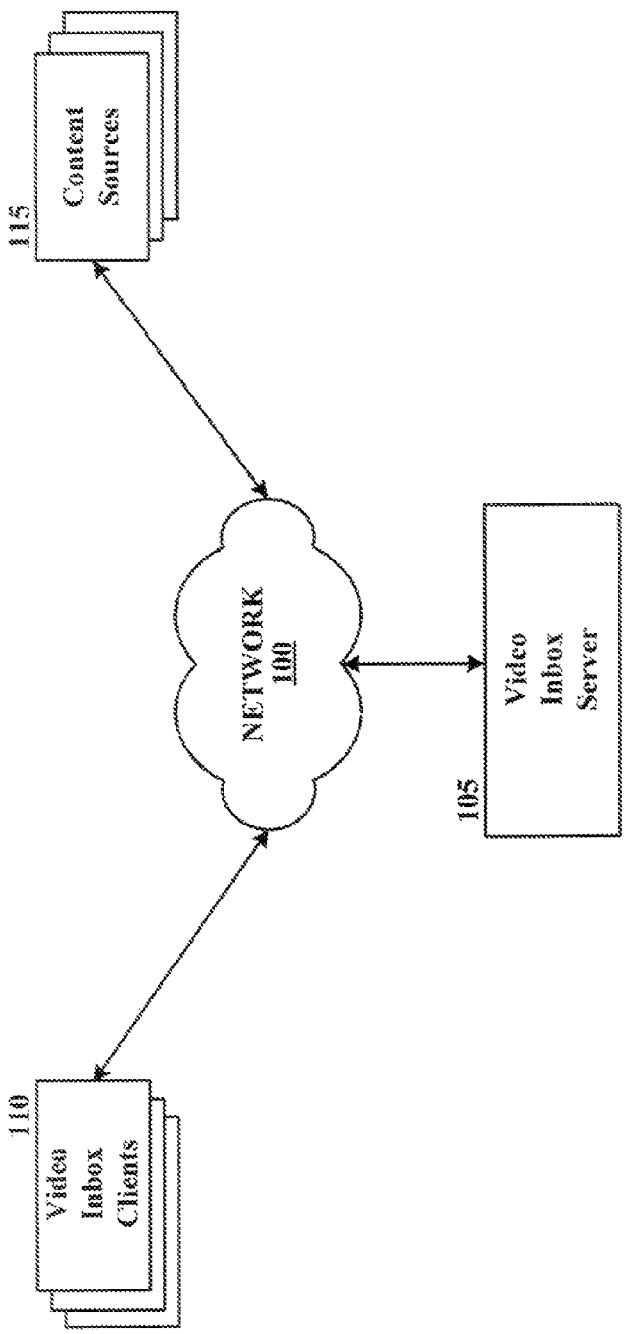
FIG. 1 is a functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of enabling the aggregation of desired video content from disparate sources so as to create a "channel" personalized for a particular user.

As used herein, the phrases "video inbox" and "video inbox system" may refer to a few different implementations of the same general concept, namely a system that allows a user to access video content originated from disparate sources, where the video content is personalized for the user and available to the user regardless of his location. Similar to regular e-mail, the video inbox may be thought of as an aggregator, or as a way of filtering the large amount of video content available to a user down to only that content he finds interesting, and into a single place for consumption.

Presently, there is a large amount of video content available on the Internet and through existing video service providers (e.g., cable, satellite, broadcast, etc.), and it is no longer the case that a television within one's home is the only way to consume video content. Between the content providers, there are literally thousands of channels available to a viewer. In addition, the popularity of Internet sites that host video content ("Internet video sites") and make it available for consumption by the general public (e.g., Yahoo!™ Video, YouTube™, Google™ Video, etc.) has greatly increased the number of "channels" a user has to choose from.

Further, many broadcast and cable channels now offer online, streaming video of their regular shows so that viewers can watch them on their computers any time they want. In addition to watching shows on their computers, users may also watch some shows and other content on their mobile phones, which are becoming more like general-purpose computers, limited mainly by their connectivity speeds, screen sizes, and the like (i.e., other aspects of scalability). Currently, mobile service providers offer consumers the ability to watch TV shows, news, sports highlights, etc. on their mobile phones, and some mobile devices can simply view videos just as any other client would (e.g., a regular desktop computer, etc.).

It will be appreciated by those of skill in the art, that in the context of Internet video services/sites, DVRs, etc., the idea of a channel is fairly fungible. For example, one may consider as a channel a syndication feed which uses, for example, Really Simple Syndication (RSS), Atom, etc. to format the feed; in such an implementation, a user may "subscribe" to a feed associated with a particular content provider (e.g., another user who uploads content to a video service once a week, a podcast producer, etc.). In addition to the feeds for particular content providers, a video service may offer feeds defined by any of a number of other criteria, such as, for example, most popular, most viewed, content tagged/labeled with a certain term or phrase, etc. While video services may use RSS/Atom syndication as a way of alerting interested users of new content, there may also be a proprietary system worked out between the video inbox system and the respective video service. As another example, those shows saved by a user to his personal DVR may collectively be thought of as a channel corresponding to the user's particular interests.

While there is abundant content, it is not equally distributed or always available across TV, web, mobile devices, etc. One purpose of a personal video channel is to aggregate all of the disparate content and, to the extent possible, make it available to the user, over a network, no matter where he is or what device he is using. Like an e-mail application—a centralized and personalized inbox of text e-mail—the personal video inbox can create a one-stop-shop for video that the user finds interesting, irrespective of the source of the content (e.g., cable, DVR, a website, VoD, etc.).

FIG. 1 is a functional block diagram of the general architecture of an exemplary embodiment of the present invention. Generally, the backend of the system may be implemented on Video Inbox Server 105, which may comprise one or multiple machines, one or more databases, etc., as needed. Video Inbox Server 105 may do the majority of the work required by the system, including, but not limited to, managing the user accounts and associated video content for each account, requests processing, notification processing, access control, etc. "Accounts" may comprise an identifier (e.g., a username or similar, etc.) and an authentication scheme (e.g., a login and password, etc.); similar to any other service, such an account allows Video Inbox Server 105 to associate certain video content with a certain user (i.e., the video content the user is subscribed to, that together comprises his personal "channel"). Requests processing, notification processing, and access control are discussed below in reference to FIG. 3.

A Video Inbox Server 105 also may handle the task of content-sharing between users of the system. For example, Video Inbox Clients 110 (as detailed below) may allow the user to specify that certain video content be shared with "friends" of the user; in such a case, Video Inbox Server 105 may simply include the shared content in the friend's aggregated channel information (subject to rights management issues, as discussed herein).

Video Inbox Server 105 may also provide recommendation functionality, such that a particular user's selections (i.e., the video content he chooses to be a part of his personal video channel, etc.) helps to inform Video Inbox Server 105 of his likes and dislikes, subsequently allowing Video Inbox Server 105 to suggest particular content the system thinks the user may enjoy. Moreover, Video Inbox Server 105 may employ a ratings system (e.g., where a user, through Video Inbox Client 105, may mark a certain show as a "favorite," etc.) that may further inform a system-generated recommendation. Information provided by a user regarding the content to which he is subscribed, his "friends," his likes and dislikes, his login and password, etc., may collectively be referred to as "channel settings" (i.e., those settings that define his personalized video channel). In addition to system-generated recommendations, channel settings may also be used by Video Inbox Server 105 to generate advertisements to be relayed to Video Inbox Clients 110. The advertisements may or may not be related to content currently being consumed, and may be displayed in many different forms (e.g., video, images, audio, etc.) and in various contexts (e.g., overlayed on video the user is currently watching, as an interstitial, etc.).

In one embodiment, Video Inbox Server 105 may offer web services for interacting with it; web services generally allow users to take advantage of web-based applications while abstracting them away from the usual web browser paradigm. Generally, web services comprise an Application Programming Interface (API) through which the machines (i.e., Video Inbox Clients 110 and Content Sources 115) may talk to each other and exchange information. The operation and purpose of web APIs are well known in the art. Briefly, however, and much like any API, a web API is an interface to some service running on a remote system and accessed over a network. Various, sometimes overlapping, methods and protocols exist for implementing web APIs, such as, for example, Simple Object Access Protocol (SOAP), Representative State Transfer (REST), XML-RPC, etc., and most use variations of Extensible Modeling Language (XML) data formats for messaging (i.e., transferring data between the web service and the local application).

In another embodiment, the user's interaction with Video Inbox Server 105 (e.g., to change account settings, etc.) may be through a website interface accessed through, for example, a web browser.

Video Inbox Clients 110 are those applications that end users may use to discover/view the latest content "added" to their personal video channel and interact with the options/ settings offered by Video Inbox Server 105. Video Inbox Clients "talk" to Video Inbox Server 105 over network 100, and usually through a web service offered by Video Inbox Server 105 (as discussed above). For the system to work as intended—as a personal video channel, accessible from anywhere—Video Inbox Clients 110 may be implemented in any of a number of different ways for use on myriad devices so that the user may be informed of, and consume, new content irrespective of his location.

In one embodiment, such a client may be implemented as a Rich Internet Application (RIA); as is known in the art, a Rich Internet Application (RIA) is one that runs locally (e.g., on a user's computer) but interacts with a remote service (e.g., a web service, as discussed above). It is through web services that RIAs usually operate, and because the RIAs are local and are not necessarily bound by the traditional client/server architecture, they tend to bypass the usual interaction loop and take on more of the processing requirements, thereby allowing for "richer" manipulation of data than may otherwise be possible. One of the technologies used to provide this type of experience is Asynchronous JavaScript and XML (Ajax), which enables RIAs (and web pages generally) to interact with web sites asynchronously (i.e., behind-the-scenes, outside of the usual page-loading process); because Ajax allows for parts of a page to be loaded in the background each time new data is requested, the interaction between the RIA and the server can feel much more responsive than it otherwise would.

While RIAs may be implemented within a web browser, they also may exist as completely stand-alone applications—local [desktop] applications capable of talking to, and interacting with, web applications. While there are various frameworks and platforms specifically designed for RIAs (e.g., Adobe's™ Adobe Integrated Runtime, Microsoft's Silverlight™, etc.), they can also be constructed using traditional programming languages, such as, for example, Java™, C++, etc.

Figure 2:
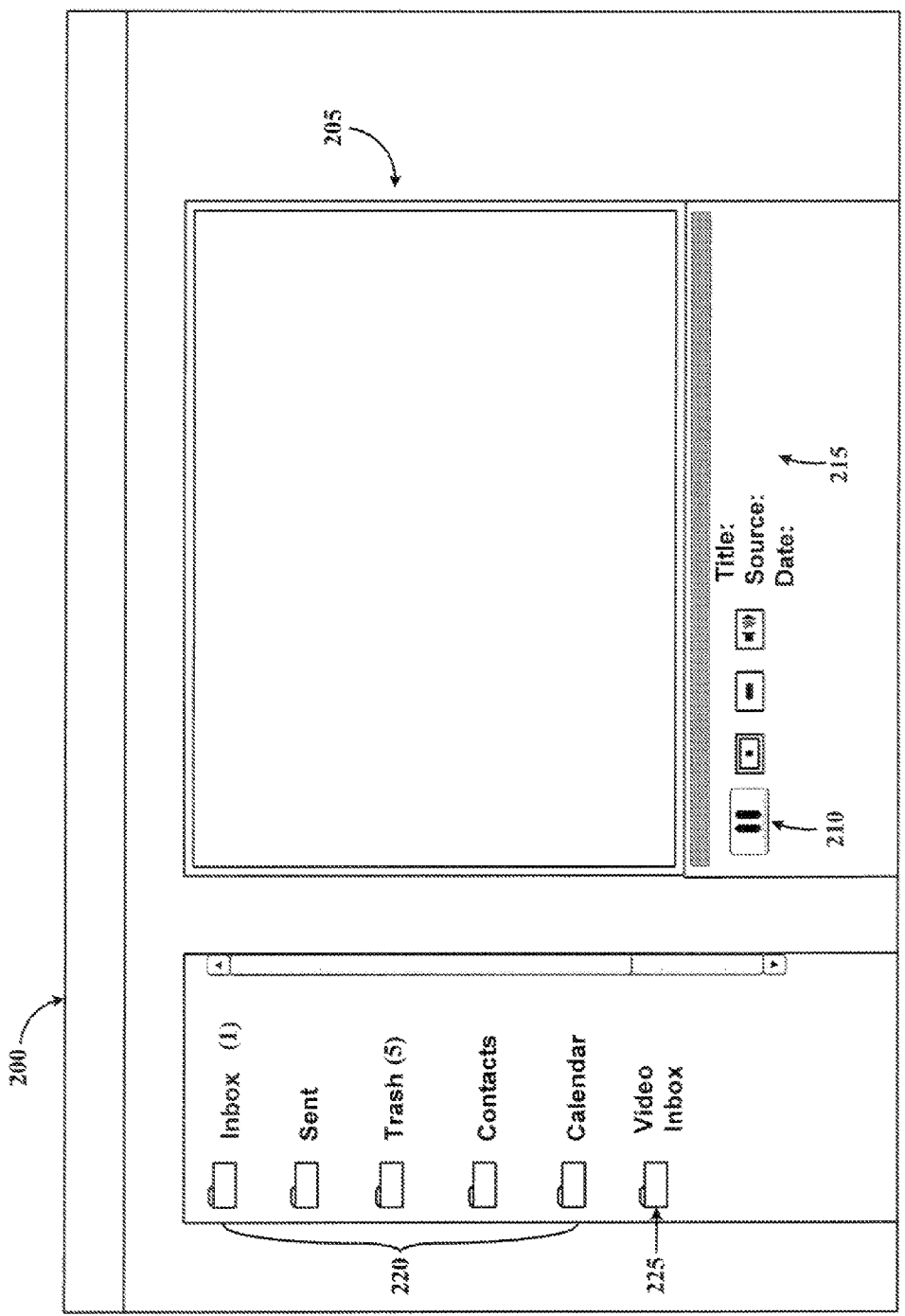
FIG. 2 is an example of how the present invention may operate inside a webmail client.

In another embodiment, and as illustrated in FIG. 2, Video Inbox Client 110 may be integrated into a webmail "client" 200, which is an "application," generally running within a web browser, that interfaces with a server-side webmail provider (e.g., Yahoo!™ Mail, etc.). Such an application will likely consist of some combination of HTML, CSS, asynchronous JavaScript and XML, etc., but is by no means limited to such an implementation (e.g., one may be inclined to build an interface entirely in Flash®, etc.). In such an embodiment, the user may be able to stream videos from within the e-mail interface, as illustrated by integrated Video Inbox Client 205, and not have to load any other applications (e.g., those native applications discussed below); for example, where the body of an e-mail is usually found, a Flash™-based implementation of Video Inbox Client 110 may reside, capable of interacting with Video Inbox Server 105 and streaming content from Content Sources 115.

The webmail client 200 may have e-mail folders 220, and may also include a Video Inbox "button" 225 for launching integrated Video Inbox Client 205. Video Inbox controls 210 are available to the user just as they are on other implementations of Video Inbox Client 110 (i.e., Video Inbox controls 210 are part of integrated Video Inbox Client 205), and may include the ability to play/pause videos, share videos with friends, etc. It will be appreciated that In addition to Video Inbox controls 210, other content information 215 may be displayed by integrated Video Inbox Client 205, such as, for example, content source, date, title, etc.

In addition to RIAs and web browser interfaces, Video Inbox Clients 110 may be implemented as native applications, developed specifically for various devices and/or operating systems. For example, Video Inbox Clients 110 may be developed for various desktop operating systems, various "mobile" operating systems (i.e., those used on a mobile phone, personal digital assistant, etc.), various DVR operating systems, various TV set-top boxes, etc.

Content Sources 115 are those services that provide video content. These services may include video-on-demand (VoD) providers, Internet video sites (e.g., Yahoo!™ Video, YouTube™, etc.), personal Digital Video Recorders (DVRs), local TV broadcasts, etc. Content Sources 115 may alert Video Inbox Server 105 to a content change or addition ("video content data") in various ways. In one embodiment, Content Sources 115 may use a syndication format to tell Video Inbox Server 105 when it has updated its content. Generally, in such a case, the Content Source 115 updates a syndication file on a web server, and Video Inbox Server 105 polls this file at a pre-determined frequency (e.g., once an hour, etc.). If Video Inbox Server 105 perceives a change in the file (i.e., something has been added to it since the last time it was checked), it evaluates the new video content data, as described in more detail below in reference to FIG. 3. In another embodiment, Content Sources 115 may provide an API through which Video Inbox Clients 110 and Video Inbox Server 105 may talk to each other and exchange information (e.g., updated video content, the streaming of video from Content Sources 115 to Video Inbox Clients 110, etc.).

It will be appreciated by those of skill in the art that the method of accessing and/or exchanging the video content data and streaming the video content is not limited to those methods outlined above, but may also include any combination and permutation of the described methods and other methods generally known in the art.

Generally, the information exchanged between the three main components of the system, namely Video Inbox Server 105, Video Inbox clients 110, and Content Sources 115, may comprise links or pointers to the actual content. In one embodiment, such links may be in the form of Universal Resource Indicators (URIs), and may comprise any of a number of different protocols, such as, for example, the Hypertext Transfer Protocol (HTTP), the File Transfer Protocol (FTP), etc., and any secure implementations thereof (e.g., sFTP, etc.). For example, a URI to a video hosted at the Yahoo!™ Video service may take a form similar to: http://video.yahoo.com/video/play?vid=953086.

In another embodiment, the links or pointers may be proprietary as between Video Inbox Server 105, Video Inbox Client 105, and Content Sources 115, or some combination thereof. For example, it may be the case that a particular content source offers a means, other than a URI, through which its content may be accessed over Network 100. In such a case, Video Inbox Server 105 may be apprised of the method, protocol, etc., and subsequently "support" that particular content source (i.e., be able to relay the information to Video Inbox Clients 110 in such a way as to allow the clients to receive the information and consume the referenced content).

Figure 3:
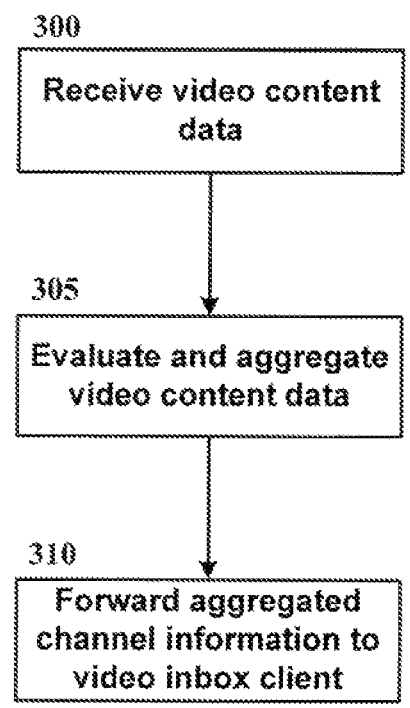
FIG. 3 is a flowchart illustrating how a video inbox server may receive and send video content data.

FIG. 3 is a flowchart illustrating the general process by which Video Inbox Server 105 receives video content data related to new or updated video content and forwards the aggregated channel information to Video Inbox Clients 110. As illustrated at block 300, Video Inbox Server 105 receives video content data from Content Sources 115. As previously discussed, the video content data may be "sent" from Content Sources 115 using any of a number of different methods and formats, and consequently, Video Inbox Server 105 may receive the video content data using any of a number of different methods and formats. For example, if a content source is an Internet video service (e.g., Yahoo!™ Video, etc.), then such service may alert subscribers to changes in the content by updating a syndication file indicating certain properties of the new content, such as, for example, the title of the content, the length of the content, copyright information, the video codec used to encode the content (i.e., the format of the content), the name of the author/producer of the content, the date the content was produced or made available, etc. Video Inbox Server 105 can be made aware of the video content data reception method (e.g., syndication, etc.) in various ways, such as, for example, the user explicitly telling Video Inbox Server 105 what file to poll, previous dealings with that particular service, etc. As another example, consider a VoD service that allows the user to download video directly from the Internet. In such an implementation, the VoD service may have an API (as discussed above) through which Video Inbox Server 105 may receive updated video content data.

Irrespective of the "exchange" method, Video Inbox Server 105 may use it to determine if there is updated video content data from any of the content sources. If there is updated video content data, Video Inbox Server 105 can evaluate the video content data, as illustrated at block 305. The evaluation of the video content data may involve any number of tasks and steps. For example, it is required that Video Inbox Server 105 knows to which users the new video content data will be forwarded as part of the users' aggregated channel information. Such a determination may be made in any of a number of different ways, three of which are described below by way of example.

In one implementation, Video Inbox Server 105 may receive updated video content data from every Content Source 115 subscribed to by every user of the system, irrespective of who is actually subscribed to each Content Source 115. In this case, once updated video content data is available, Video Inbox Server 105 may realize who is subscribed to that particular content source and may forward the information accordingly, as part of the user's aggregated channel information.

In another implementation, Video Inbox Server 105 may segregate each user by those Content Sources 115 to which he is subscribed. In such a case, Video Inbox Server 105 may receive updated video content data multiple times for the same content source (i.e., as many times as the number of users subscribed to the content source).

In still another implementation, deducing to which users the video content data will be forwarded may involve a combination of the above methods; indeed, such a combination may be required where a user is subscribed to content specific to him (e.g., content from his personal DVR, etc.) and also subscribed to content available to all other users, or where a content source supplies its information through an API which allows only a limited number of connections from Video Inbox Server 105 (e.g., thirty times an hour), etc.

Where the video content is restricted in one way or another, Video Inbox Server 105 may be made aware of the restriction and act accordingly. While most content likely will not be restricted (e.g., personal video, user-generated content, video podcasts, etc.), it may be the case that the updated video content data corresponds to content that involves various rights management issues, including whether advertisements may be displayed concomitantly with the content. For example, if a user is being sent pointers to a movie he has recorded on his personal DVR, and wants to share that content with a friend, the content ultimately received by the friend (i.e., the link to the content) may be a short preview or trailer of the movie instead of the movie itself. Such rights management may be worked out through an API used between the personal DVR and Video Inbox Server 115. For example, the personal DVR may, in its transmission of the updated video content data, also include "rights management information" regarding how, and by whom, the content may be consumed, and whether it may be accompanied by advertisements. If, for whatever reason, Video Inbox Server 105 does not understand the stated restrictions, or if the restrictions preclude any and all sharing, etc., Video Inbox Server 105 may invoke some sort of "error" handling mechanism by which the user who was to receive the content is alerted to the fact that either the content is protected and cannot be watched, or there was an error in evaluating the content, etc.

As illustrated at block 310, the updated video content data is forwarded to particular Video Inbox Clients 110 after it has been evaluated and determined to be a part of a particular user's aggregated channel. Similar to the discussion herein regarding the information exchange between Content Sources 115 and Video Inbox Server 105, the information exchange between Video Inbox Server 105 and Video Inbox Clients 110 may be facilitated through a variety of methods, including syndication and web APIs. In one embodiment, the information may be forwarded to Video Inbox Clients 110 as Video Inbox Server 105 receives it. In another embodiment, the updated video content data may be relayed according to a pre-determined schedule (e.g., once an hour, twice a day, etc.).

It will be appreciated by those of skill in the art that not all video inbox client implementations will be able to support all desired functionality, because of connectivity, screen resolution, etc. In one embodiment, Video Inbox Server 105 may know (or guess at) the limitations of the device. For example, during the initial handshake process (e.g., when the user logs in to his account, etc.), Video Inbox Clients 110 may signify to Video Inbox Server 105 the type of client and connection they are using, not unlike how a web browser transmits various client information to a web server through the user-agent string. Depending on the client and/or connection information supplied to Video Inbox Server 105, the server can decide which video content data to forward to the client. For example, if Video Inbox Server 105 is aware that a user is currently interacting with his personal video channel through a mobile phone (i.e., one of the Video Inbox Clients 110 is a mobile phone) with a slow Internet connection, it may choose to not forward that particular video content data to the phone (e.g., if the newly available content is High-Definition video, incapable of being streamed over a mobile phone data network, the user may not be bothered with it until he is using a client that can support it).

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, the forwarding of aggregated channel information, as illustrated at block 310, may not occur immediately after updated video content data is received and evaluated, as illustrated at blocks 300 and 305; it may be the case that multiple video content data are received before any aggregated channel information is forwarded.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
   maintaining, for each particular user of a plurality of users of a video inbox service that is remote relative to the plurality of users, a video inbox that is hosted by the video inbox service;
   wherein the plurality of users includes a particular user for whom the video inbox service maintains a particular video inbox;
   wherein the particular video inbox stores a plurality of links for the particular user;
   wherein each link, of the plurality of links that are stored in the particular video inbox, points to an individual video content item that has been determined to be of interest to the particular user;
   wherein said individual video content items to which the plurality of links point are stored at sources that are remote relative to said video inbox service;
   wherein the plurality of links include one or more links from a feed to which the particular user is subscribed, wherein the feed is associated with video content from another user of the plurality of users of the video inbox service;
   receiving an update to the feed that specifies one or more new links to one or more new video content items;
   in response to receiving the update to the feed, adding, to the plurality of links for the particular user, the one or more new links;
   in response to a request from said particular user, performing steps comprising:
   (a) reading data, maintained by the video service, that indicates the plurality of links for said particular user, and
   (b) displaying, to said particular user, information about said individual video content items pointed to by said plurality of links to allow said particular user to select any of the video content items pointed to by said plurality of links; and
   in response to said particular user selecting a particular video content item pointed to by a particular link in said plurality of links, causing the particular video content item to be delivered to a client device of said particular user from one of said sources that are remote relative to said video inbox service;
   wherein the method is performed by one or more computing devices.

2. The method of claim 1, further comprising:
   receiving, from the particular user, a second request to play video content items from said video inbox as if the video inbox were a channel;
   in response to a second request, causing two or more video content items that are pointed to by said plurality of links to be sequentially played on said client device;
   wherein causing the two or more video content items to be sequentially played includes, after the client device finishes playing a first video content item of the two or more video content items, causing the client device to start playing a second content item of the two or more video items without additional input from the particular user.

3. The method of claim 1, further comprising adding new links to the particular video inbox in response to one or more video content items that are pointed to by the new links being recommended by a different user in the plurality of users.

4. The method of claim 1, further comprising:
receiving an indication, from said particular user, of one or more video content items pointed to by said particular video inbox;
in response to the indication, performing steps comprising:
determining one or more second users who are friends of said user; and
adding to video inboxes of said one or more second users links to said one or more video content items.

5. The method of claim 1, wherein said video inbox includes one or more advertisements generated by said video inbox service.

6. The method of claim 1, wherein said video inbox is accessible by said user using a webmail application.

7. The method of claim 1, wherein said client device is selected from the group consisting of set-top box, digital video recorder, personal digital assistant, and mobile phone.

8. The method of claim 1, wherein said information about said plurality of video content items includes at least one of: title, length, copyright information, author, date, rights management information, and format.

9. The method of claim 1, wherein said sources include at least two sources from the group consisting of: cable television, satellite television, broadcast television, Internet video sites, and digital video recorders.

10. The method of claim 1, wherein the feed is a Really Simple Syndication ("RSS") feed.

11. The method of claim 1, wherein the feed is an Atom feed.

12. The method of claim 1, wherein the other user is a particular content provider.

13. The method of claim 1, wherein the other user is a friend of the particular user on the video inbox service.

14. The method of claim 1, wherein the other user is a friend of the particular user on the video inbox service.

15. A system comprising one or more computing devices that are configured to perform steps comprising:
maintaining, for each particular user of a plurality of users of a video inbox service that is remote relative to the plurality of users, a video inbox that is hosted by the video inbox service;
wherein the plurality of users includes a particular user for whom the video inbox service maintains a particular video inbox;
wherein the particular video inbox stores a plurality of links for the particular user;
wherein each link, of the plurality of links that are stored in the particular video inbox, points to an individual video content item that has been determined to be of interest to the particular user;
wherein said individual video content items to which the plurality of links point are stored at sources that are remote relative to said video inbox service;
wherein the plurality of links include one or more links from a feed to which the particular user is subscribed, wherein the feed is associated with video content from another user of the plurality of users of the video inbox service;
receiving an update to the feed that specifies one or more new links to one or more new video content items;
in response to receiving the update to the feed, adding, to the plurality of links for the particular user, the one or more new links;
in response to a request from said particular user, performing steps comprising:
(a) reading data, maintained by the video service, that indicates the plurality of links for said particular user, and
(b) displaying, to said particular user, information about said individual video content items pointed to by said plurality of links to allow said particular user to select any of the video content items pointed to by said plurality of links; and
in response to said particular user selecting a particular video content item pointed to by a particular link in said plurality of links, causing the particular video content item to be delivered to a client device of said particular user from one of said sources that are remote relative to said video inbox service.

16. The system of claim 15, wherein the one or more computing devices are further configured to perform steps comprising:
receiving, from the particular user, a second request to play video content items from said video inbox as if the video inbox were a channel;
in response to a second request, causing two or more video content items that are pointed to by said plurality of links to be sequentially played on said client device;
wherein causing the two or more video content items to be sequentially played includes, after the client device finishes playing a first video content item of the two or more video content items, causing the client device to start playing a second content item of the two or more video items without additional input from the particular user.

17. The system of claim 15, wherein the one or more computing devices are further configured to perform steps comprising adding new links to the particular video inbox in response to one or more video content items that are pointed to by the new links being recommended by a different user in the plurality of users.

18. The system of claim 15, wherein the one or more computing devices are further configured to perform:
receiving an indication, from said particular user, of one or more video content items pointed to by said particular video inbox;
in response to the indication, performing steps comprising:
determining one or more second users who are friends of said user; and
adding to video inboxes of said one or more second users links to said one or more video content items.

19. The system of claim 15, wherein said video inbox includes one or more advertisements generated by said video inbox service.

20. The system of claim 15, wherein said video inbox is accessible by said user using a webmail application.

21. The system of claim 15, wherein said client device is selected from the group consisting of set-top box, digital video recorder, personal digital assistant, and mobile phone.

22. The system of claim 15, wherein said information about said plurality of video content items includes at least one of: title, length, copyright information, author, date, rights management information, and format.

23. The system of claim 15, wherein said sources include at least two sources from the group consisting of: cable television, satellite television, broadcast television, Internet video sites, and digital video recorders.

24. The system of claim 15, wherein the feed is a Really Simple Syndication ("RSS") feed.

25. The system of claim 15, wherein the feed is an Atom feed.

26. The system of claim 15, wherein the other user is a particular content provider.

* * * * *